(12) United States Patent
Patzlsperger et al.

(10) Patent No.: US 12,296,980 B2
(45) Date of Patent: May 13, 2025

(54) SIDE GUIDE ADAPTER, SIDE GUIDE SYSTEM, CARGO DECK, AND METHOD FOR CONVERTING A CARGO DECK

(71) Applicant: Telair International GmbH, Miesbach (DE)

(72) Inventors: Andreas Patzlsperger, Waakirchen (DE); Raimo Utsch, Vogtareuth (DE)

(73) Assignee: Telair International GmbH, Miesbach (DE)

( * ) Notice: Subject to any disclaimer, the term of this patent is extended or adjusted under 35 U.S.C. 154(b) by 930 days.

(21) Appl. No.: 17/459,932

(22) Filed: Aug. 27, 2021

(65) Prior Publication Data
US 2022/0063808 A1 Mar. 3, 2022

(30) Foreign Application Priority Data

Aug. 28, 2020 (DE) .......................... 102020122577.6
Sep. 2, 2020 (DE) .......................... 102020122963.1

(51) Int. Cl.
B64D 9/00 (2006.01)
(52) U.S. Cl.
CPC ........ B64D 9/003 (2013.01); *B64D 2009/006* (2013.01)
(58) Field of Classification Search
CPC .................................................... B64D 9/003
USPC ......................................................... 410/77
See application file for complete search history.

(56) References Cited

U.S. PATENT DOCUMENTS

| | | | | |
|---|---|---|---|---|
| 3,465,998 A | * | 9/1969 | Ginn | B63B 25/24 410/92 |
| 4,629,379 A | | 12/1986 | Harris et al. | |
| 4,984,756 A | | 1/1991 | Anders | |
| 5,234,297 A | | 8/1993 | Wieck et al. | |
| 5,433,550 A | | 7/1995 | Huber | |
| 5,433,564 A | * | 7/1995 | Sundseth | B64D 9/003 410/79 |
| 5,692,862 A | * | 12/1997 | Hilde | B64D 9/003 410/80 |

(Continued)

FOREIGN PATENT DOCUMENTS

| | | |
|---|---|---|
| CN | 108569529 A | 9/2018 |
| DE | 4102274 C1 | 1/1992 |

(Continued)

OTHER PUBLICATIONS

Extended European Search Report for European Patent Application No. 21193319.7, mailed Jan. 21, 2022.

*Primary Examiner* — Hilary L Gutman
(74) *Attorney, Agent, or Firm* — Fox Rothschild LLP

(57) ABSTRACT

The present invention relates to a side guide adapter for guiding and/or retaining a cargo item in an aircraft, comprising at least one fastening element for fastening to a rail section, in particular a perforated rail section, of a side guide, at least one spacer element for bridging a distance to the cargo item, wherein the spacer element and the fastening element are hingedly connected to each other, and at least one retaining section for the cargo item, which is arranged on an end face of the spacer element and comprises at least one retaining contour for guiding and/or retaining the cargo item. Furthermore, the invention relates to a side guide system, a cargo deck, and a method for converting a cargo deck.

18 Claims, 4 Drawing Sheets

(56) References Cited

U.S. PATENT DOCUMENTS

| | | | |
|---|---|---|---|
| 8,221,038 B1 * | 7/2012 | Moradians | B64D 9/003 |
| | | | 410/69 |
| 9,315,269 B2 | 4/2016 | Holzner et al. | |
| 2005/0008443 A1 | 1/2005 | Eitzenberger et al. | |
| 2007/0086870 A1 * | 4/2007 | Schulze | B60P 7/13 |
| | | | 410/77 |
| 2007/0237598 A1 | 10/2007 | Schulze | |
| 2009/0324356 A1 | 12/2009 | Schulze et al. | |
| 2011/0176903 A1 | 7/2011 | Schulze et al. | |
| 2013/0145593 A1 | 6/2013 | Holzner et al. | |
| 2013/0259593 A1 * | 10/2013 | Moradians | B64D 9/003 |
| | | | 410/77 |
| 2018/0265303 A1 | 9/2018 | Heitplatz et al. | |
| 2019/0382095 A1 | 12/2019 | Junior et al. | |

FOREIGN PATENT DOCUMENTS

| | | | | |
|---|---|---|---|---|
| DE | 4216413 A1 | 1/1994 | | |
| DE | 102010024330 A1 | 12/2011 | | |
| DE | 102010060467 A1 | 3/2012 | | |
| EP | 3778395 A1 * | 2/2021 | | B60P 7/0815 |
| GB | 2436715 A | 10/2007 | | |
| WO | 02100718 A1 | 12/2002 | | |

\* cited by examiner

SIDE GUIDE ADAPTER, SIDE GUIDE SYSTEM, CARGO DECK, AND METHOD FOR CONVERTING A CARGO DECK

CROSS-REFERENCE TO RELATED APPLICATIONS

The present application claims priority to German Patent Application No. 10 2020 122 577.6, filed Aug. 28, 2020 and German Patent Application No. 10 2020 122 963.1, filed Sep. 2, 2020, which are incorporated herein by reference in their entirety.

BACKGROUND

The invention relates to a side guide adapter for guiding and/or retaining cargo items, a side guide system comprising such a side guide adapter, a cargo deck equipped with a side guide adapter or a side guide system, and a method for converting a cargo deck.

It is well known that aircraft cargo holds are often modified for different purposes. For example, it may be necessary to configure a cargo deck depending on the cargo items to be loaded. When cargo is transported on aircraft, cargo items, such as containers or pallets, with standardized dimensions are often used. For example, for containers used in civil aviation, there are the following standard sizes: 123.5 cm by 317.5 cm (88 inches by 125 inches), 143.8 cm by 317.5 cm (96 inches by 125 inches), 223.5 cm by 157.5 cm (88 inches by 62 inches). Pallets measuring 274.3 cm by 223.5 cm (108 inches by 88 inches) are commonly used in military applications.

To hold and guide such cargo items, side guides mounted on the cargo deck are used, each extending in the longitudinal direction of the cargo deck in the area of a side wall of the aircraft.

For optimum utilization of a cargo deck, it is necessary to offer a wide range of configuration options, with fast conversion of the cargo deck being a high priority. Since different cargo items often have different dimensions, there may be a gap or distance between a cargo item and the respective side guide. For example, this may occur when configuring the cargo deck to transport military pallets.

To safely guide or hold such cargo items, adapters can be used to bridge the lateral distance between the cargo item and the side guide.

DE 10 2010 024 330 A1, for example, describes an air freight pallet that has additional adapter rails to bridge a gap at the side. The adapter rails are arranged on the pallet and form an extension of the pallet towards the side guide. The disadvantage of the air freight pallet according to DE 10 2010 024 330 A1 is that it is not a standardized cargo item for transport in aircraft and therefore deviates from standard dimensions. Furthermore, the adapter rails require more space for storage in the cargo deck.

DE 41 02 274 C1 describes a side guide device which is arranged on two spaced-apart seat rails, wherein a latch hook of the side guide device can be moved toward the cargo item and the cargo item is thus held laterally. The disadvantage here, however, is that the cargo deck can only be adapted with great effort. Furthermore, a cargo deck with such side guide devices has a high overall weight.

Suitable devices for bridging a lateral gap must be quick and easy to attach, since the cost of operating such aircraft is very high. Furthermore, the configuration or conversion of the cargo deck should be very easy to carry out. In addition, the equipment of the cargo deck, especially the adapters, must be robust, since they are exposed to high loads and gentle handling cannot be demanded due to the high time pressure during loading and unloading. A cargo deck with appropriate adapters is often exposed to wetness, high temperature differences, dust and other rough influences. A defective cargo deck-even just a defective functional element of the cargo deck—can result in the corresponding aircraft being unable to operate for several days. Such a failure results in high costs.

SUMMARY

The invention is therefore based on the object of providing a side guide adapter that facilitates the conversion of a cargo deck to cargo items with different dimensions, is easy to handle and holds cargo items securely. The invention is further based on the object of providing a side guide system, a cargo deck and a method for converting a cargo deck.

According to the invention, this object is solved with regard to a side guide adapter. With regard to the side guide system, the cargo deck and the method for conversion, the aforementioned object is solved by a system, cargo deck, and method according to the invention. Advantageous designs result from the subclaims.

Specifically, the problem is solved by a side guide adapter for guiding and/or retaining a cargo item, in particular a pallet, in an aircraft, wherein the side guide adapter comprises:

- at least one fastening element for fastening to a rail section, in particular a perforated rail section, of a side guide;
- at least one spacer element for bridging a distance to the cargo item, wherein the spacer element and the fastening element are hingedly connected to each other; and
- at least one retaining section for the cargo item, which is arranged on an end face of the spacer element and has at least one retaining contour for guiding and/or retaining the cargo item.

In other words, the side guide adapter is designed to guide a cargo item when it is inserted into the cargo hold of a cargo deck of an aircraft and to hold the cargo item in the inserted state, i.e. at the end position. The side guide adapter thus performs a guiding and retaining function.

Preferably, the cargo item is a pallet used in the military sector. Such pallets have guide elements arranged laterally on the pallets. A pallet with guide elements is known, for example, from the aforementioned DE 10 2010 024 330 A1.

An essential idea of the present invention is that the side guide adapter comprises a folding function which allows a quick and easy conversion of the cargo deck. For this purpose, the side guide adapter has a fastening element and a spacer element which are connected to one another via a hinge. Via the hinged connection of the fastening element and the spacer element, the side guide adapter is designed to be foldable. In other words, the fastening element and the spacer element can be pivoted relative to each other and/or from each other. This has the advantage that the side guide adapter can be quickly and easily attached to the rail section via the fastening element during assembly and the spacer element can then be folded down into its holding and guiding position.

In the folded state, the side guide adapter has a compact design so that it can be stored in the cargo deck to save space. The folded state of the side guide adapter means that the fastening element and the spacer element are essentially aligned in a common plane.

During use, the side guide adapter is in the unfolded state with the fastening element attached to a rail section and the spacer bridging a distance between a side guide and a cargo item.

Side guide means a device designed to guide cargo items in the longitudinal direction (X-axis) of the aircraft (from nose to tail, or from tail to nose). During flight, the side guide absorbs forces transverse to the longitudinal direction (Y-axis) and holds the cargo items in position. Preferably, guide rollers engage and support the cargo items from below. They allow easy and low-friction transport of the cargo items within the cargo hold.

The spacer element forms a spacer to bridge the distance between the side guide and the cargo item. The spacer element restricts the cargo item laterally. This prevents lateral movement of the cargo item, for example during a flight or during loading and unloading. Particularly preferably, the spacer element absorbs the forces occurring in the transverse direction of the aircraft (Y-axis) from the associated cargo item and transmits them to the side guide.

In use, the side guide adapter absorbs forces transversely to the longitudinal direction (Y-axis) of the aircraft and transmits them to the side guide. The spacer element is thus designed to transmit forces transversely to the longitudinal direction. Preferably, the side guide adapter can also absorb forces in the longitudinal direction (X-axis) of the aircraft. The forces occurring during flight in the vertical direction (Z-axis) of the aircraft are preferably absorbed by means of additional locking devices.

The unfolded state of the side guide adapter means that the fastening element and spacer element are each arranged in a different plane. The two planes are preferably spaced apart from each other in a vertical direction of the aircraft (Z-direction). In use, the fastening element is arranged in a first plane in the region of the rail section and the spacer element is arranged in a second plane in the region of a loading plane of the cargo deck. Preferably, the fastening element is arranged above the spacer element. In other words, the first plane is preferably arranged above the second plane.

The side guide adapter also has a retaining section with a retaining contour that guides and retains the respectively assigned cargo item. The retaining section and thus the retaining contour are arranged on the front side of the spacer element. In other words, the retaining section is arranged on the spacer element in such a way that the retaining contour faces the cargo item for guiding and retaining. The retaining contour is designed in such a way that, in use, an at least partially form-fitting connection with a cargo item is made possible. The retaining contour provides improved guidance of the cargo item, so that loading and unloading in particular is facilitated.

The front side of the spacer element forms that side of the spacer element which faces the cargo item when the side guide adapter is unfolded and in use.

A further aspect of the invention relates to a side guide system comprising a side guide having at least one rail section, and at least one abutment surface, and at least one side guide adapter, in particular a side guide adapter according to the invention, wherein in the unfolded state a fastening element of the side guide adapter is fastened to the rail section and a spacer element of the side guide adapter abuts the abutment surface of the side guide.

The abutment surface of the side guide is used to transfer forces occurring transverse to the longitudinal direction from the spacer element to the side guide. The spacer element abuts the abutment surface for this purpose.

The advantage of this is that the forces occurring in the transverse direction of the cargo deck during a flight or during loading and unloading of the cargo hold are transferred from the cargo item to the side guide and thus absorbed by the structure of the aircraft. The respective cargo item is thus held in an improved manner. In addition to its guiding and retaining function, the side guide adapter thus also fulfills a force transmission function.

Preferably, the rail section extends in the longitudinal direction of the cargo deck. Preferably, the rail section is formed by a perforated rail section. The perforated rail section may have at least two holes for fastening the fastening element. Preferably, the fastening element engages in the rail section, in particular the perforated rail section, for fastening the side guide adapter.

The side guide system according to the invention may alternatively or additionally comprise individual features or a combination of several features previously mentioned with respect to the side guide adapter.

Preferably, the side guide adapter according to the invention or the side guide system according to the invention are designed for use in a lower deck area ("lower deck") of an aircraft. The range of use is not limited to the aforementioned.

The embodiments described below relate to advantageous designs of the side guide adapter according to the invention and/or the side guide system according to the invention.

In a preferred embodiment, the spacer element and/or the fastening element is mounted rotatably about at least one hinge axis. The hinge axis preferably extends parallel to the end face of the spacer element. This has the advantage that, during assembly on the side guide, the spacer element can be folded down laterally with its end face, in particular in the Y-direction. This simplifies assembly considerably, reducing the effort required to convert the cargo deck.

In a further preferred embodiment, the fastening element is rotatably mounted about a first hinge axis. In addition or alternatively, the spacer element is preferably rotatably mounted about a second hinge axis. In other words, the spacer element and the fastening element are each rotatably mounted about a separate hinge axis. The two hinge axes are spaced apart from one another. The spacer element and the fastening element are connected to each other here by a double hinge. In other words, the spacer element and the fastening element are connected to each other in a double-jointed manner. The two hinge axes are preferably aligned parallel.

The double-jointed connection of the two elements enables the fastening element and the spacer element to be aligned at different levels during assembly. Specifically, this makes it possible to compensate for a height offset, particularly in the vertical direction (Z-axis) of the aircraft, between a fastening point of the fastening element and a loading level of the cargo deck.

Alternatively, it is possible for the fastening element and the spacer element to be rotatably mounted about a single, common hinge axis.

Preferably, the side guide adapter comprises at least one connector which comprises the at least one hinge axis and hingedly connects the spacer element to the fastening element. Particularly preferably, the first hinge axis and the second hinge axis are part of the connector. The connector connects the fastening element to the spacer element. Preferably, the connector extends between the spacer element and the fastening element. The connector extends transversely to the end face of the spacer element. In other words, the connector is arranged transversely to the end face of the spacer element. The connector preferably forms a transverse web between the spacer element and the fastening element. The two hinge axes are preferably arranged at a respective longitudinal end of the connector.

In the unfolded state, the connector extends between two vertically offset planes, in each of which one of the two elements is arranged. In the folded state, the connector is essentially in the same plane as the fastening element and the spacer element. This enables space-saving storage of the side guide adapter in the cargo deck.

In a particularly preferred embodiment, the spacer element has at least one receiving opening into which the fastening element and/or the connector can be pivoted for storage. In other words, the fastening element and the connector can be pivoted into the receiving opening. Alternatively, the connector may be at least partially pivotable into the receiving opening. The receiving opening serves to receive the fastening element or the connector in order to allow the side guide adapter to be folded in. The receiving opening realizes a particularly compact form of the side guide adapter in the folded state. This reduces the space required for storing the side guide adapter.

Through the receiving opening, the fastening element and/or the connector can be arranged recessed in the spacer element in the folded state. It is possible that the at least one hinge axis or at least one of the two hinge axes is arranged in the receiving opening.

The spacer element can have at least one support surface that at least partially delimits the receiving opening, so that in the pivoted state the connector and/or the fastening element rest on the support surface. The pivoted state corresponds to the folded state of the side guide adapter. When the adapter is in the folded state, the connector and the fastening element can rest on the support surface. Alternatively, it is possible for the connector or the fastening element to rest on the support surface in the folded state.

The receiving opening preferably forms a free passage, which is limited at least in sections by the at least one support surface. This achieves a weight reduction of the side guide adapter. Alternatively, it is conceivable that the receiving opening is formed by a recess in the spacer element which is completely closed at the bottom.

Preferably, the spacer element has at least one surface with which the fastening element is at least flush in the pivoted state. In other words, the fastening element is completely recessed in the spacer element in the folded state. In the folded state, the side guide adapter thus has a particularly space-saving design.

The surface of the spacer element preferably extends substantially transversely to the end face of the spacer element. In use or in the unfolded state of the side guide adapter, the surface is arranged to lie on top in the vertical direction (Z-axis) of the aircraft. The surface preferably at least partially encloses the receiving opening for receiving the fastening element and/or the connector.

Particularly preferably, the spacer element is of plate-shaped design. In other words, the spacer element forms a spacer plate. The spacer element has at least one longitudinal extension and at least one transverse extension, wherein preferably the end face is formed on one of the longitudinal extensions. Preferably, the spacer element is formed in a cuboid shape. The spacer element thus comprises a further side which is arranged opposite the end face. The further side forms a stop side of the spacer element which, in the unfolded state, interacts with the abutment surface of the side guide of the side guide system according to the invention. Specifically, the abutment side of the spacer element is in direct contact with the abutment surface of the side guide in the installed and unfolded state, in order to transmit any transverse forces that occur to the side guide. The plate-shaped design of the spacer element allows the side guide adapter to be arranged as compactly as possible in a flat plane of the cargo deck when folded in. Preferably, the side guide adapter is arranged below the loading level of the cargo deck for this purpose.

The fastening element and/or the connector can additionally or alternatively also be of plate-shaped design.

In a preferred embodiment, one/the retaining contour has two retaining lugs arranged opposite one another, which are designed to protrude from the spacer element and are spaced apart from one another to accommodate the cargo item. In other words, the retaining contour is U-shaped. The retaining contour or the retaining lugs enable an at least partially form-fitting connection of the side guide adapter to the cargo item, which ensures guiding or retaining of the cargo item during use of the side guide adapter.

The two retaining lugs preferably enclose a free space between them, which is designed to at least partially accommodate a cargo item. In other words, the retaining contour is preferably formed in such a way that it is open in a direction facing away from the end face. In use, the two retaining lugs form an upper and lower boundary, respectively, in the vertical direction (Z-axis) of the aircraft for the cargo item. The retaining lugs may be formed such that a clearance is provided between the cargo item or a guide element of the cargo item and the retaining lugs, respectively. This provides a clearance that facilitates guidance of the cargo item.

In another preferred embodiment, a/the retaining section of the side guide adapter, which has the retaining contour, is hinged or fixed to the end face of the spacer element. In other words, the retaining section may be relatively movable at the end face. The retaining section may form a separate part that is arranged on the spacer element so as to be laterally pivotable. Preferably, the retaining section is arranged on the spacer element that it can be folded down laterally. Here, it is advantageous that the retaining section in the laterally folded-down state has an improved shape for storing the side guide adapter.

Alternatively, it is possible for the retaining section to be fixed to the end face. In this case, the retaining section is part of the spacer element. In other words, the retaining section preferably forms part of the end face of the spacer element. This advantageously simplifies handling of the side guide adapter, since the retaining section forms a compact component with the spacer element.

The side guide adapter can have several retaining sections of a respective retaining contour. Alternatively, it is possible for the side guide adapter to have a single retaining section with at least one retaining contour.

Preferably, the fastening element comprises at least two spaced-apart pins for engaging the rail section. At least one of the two pins can be arranged to be displaceable. The fastening element is preferably of elongated design. The two pins are arranged on the fastening element spaced apart from one another. Preferably, one of the two pins is displaceably arranged in an elongated hole. The distance between the two pins is adjustable. Here it is advantageous that, in the case of different distances between fastening points of the rail section distance between the two pins can be adjusted to the corresponding positions of the fastening points. This advantageously increases a functionality of the side guide adapter when fastening to the rail section.

Alternatively, it is possible for the fastening element to have a single pin. The pin(s) preferably protrude(s) beyond a lower edge of the fastening element and is/are designed to engage the rail section for fastening.

In a preferred embodiment of the side guide system according to the invention, the side guide has at least one stop element, preferably several stop elements, which is arranged above the spacer element in the installed position. In other words, the side guide comprises at least one stop element, wherein the spacer element is arranged below the stop element in use. Preferably, a plurality of stops are arranged on the side guide rail, which limit the spacer element in the installed position above. Preferably, the stop element projects at least partially beyond the spacer element in the direction of the end face of the spacer element. Here it is advantageous that the stop element prevents the spacer element from lifting off the side guide and is thus held on the side guide.

According to an alternative arrangement, the invention relates to a cargo deck having at least one side guide adapter according to the invention and/or at least one side guide system according to the invention.

In a preferred embodiment of the cargo deck according to the invention, a plurality of side guide adapters are arranged in a folded state for storage in a common plane that lies below a loading plane of the cargo deck. In this regard, the side guide adapters may be arranged in a row in a longitudinal direction. Preferably, the side guide adapters are arranged in a common plane between at least two roller conveyors below the loading plane of the cargo deck. This allows the side guide adapters to be stored in a space-saving manner in the unused cargo space area of the cargo deck. Furthermore, it is advantageous that the side guide adapters are quickly available for reconfiguration or refitting of the cargo deck.

According to an alternative arrangement, the invention relates to a method for converting a cargo deck of an aircraft by means of at least one side guide adapter, in particular a side guide adapter according to the invention, which comprises at least one fastening element and at least one spacer element which are hingedly connected to one another, in which method the side guide adapter is attached to a rail section via the fastening element and subsequently the spacer element is folded down in such a way that the spacer element abuts an abutment surface of a side guide of the cargo deck.

With regard to further advantages concerning the cargo deck and the method, reference is made to the advantages explained in connection with the side guide adapter and the side guide system. Furthermore, the cargo deck and the method may alternatively or additionally have individual or a combination of several features previously mentioned with respect to the side guide adapter as well as the side guide system.

BRIEF DESCRIPTION OF THE DRAWINGS

The invention is explained in more detail below with reference to the accompanying drawings. The embodiments shown represent examples of how the side guide adapter according to the invention, the side guide system according to the invention and the cargo deck according to the invention can be designed.

The drawings show as follows.

DETAILED DESCRIPTION

Figure 1:
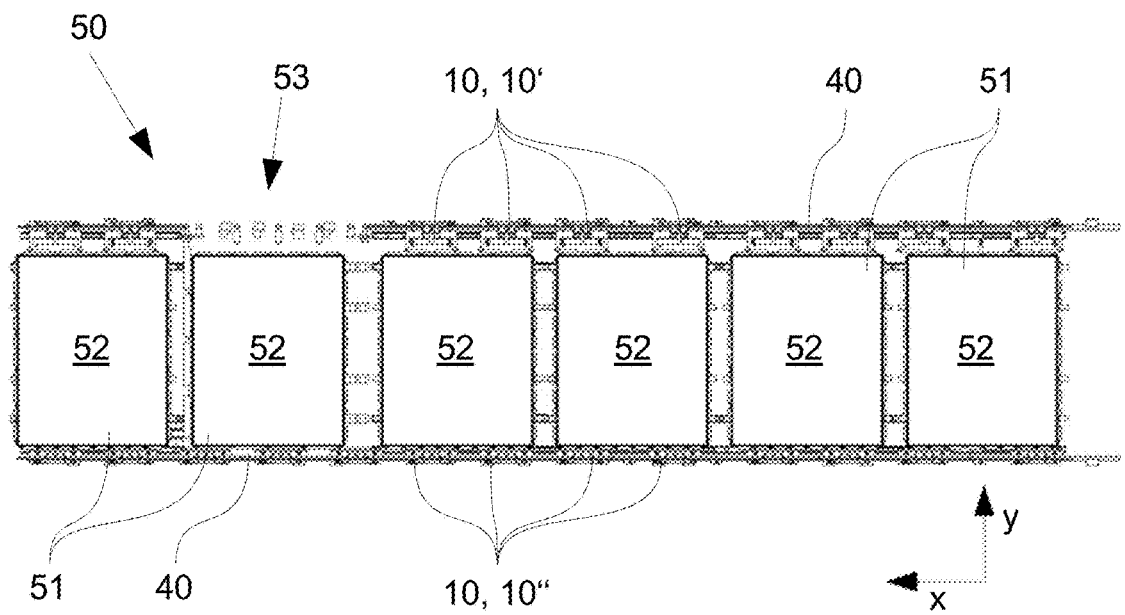
FIG. 1 shows a top view of a cargo deck according to a preferred exemplary embodiment according to the invention.

In the following, the same reference numerals are used for identical and identically acting parts. Usually, a Cartesian coordinate system is used to provide individual directional information within an aircraft.

Here, the X-axis extends from the tail to the nose, the Y-axis extends transversely to the X-axis and lies essentially in the plane spanned by the wings. The Z-axis is perpendicular to the X- and Y-axes. This can be seen in FIGS. 1 and 2.

Figure 2:
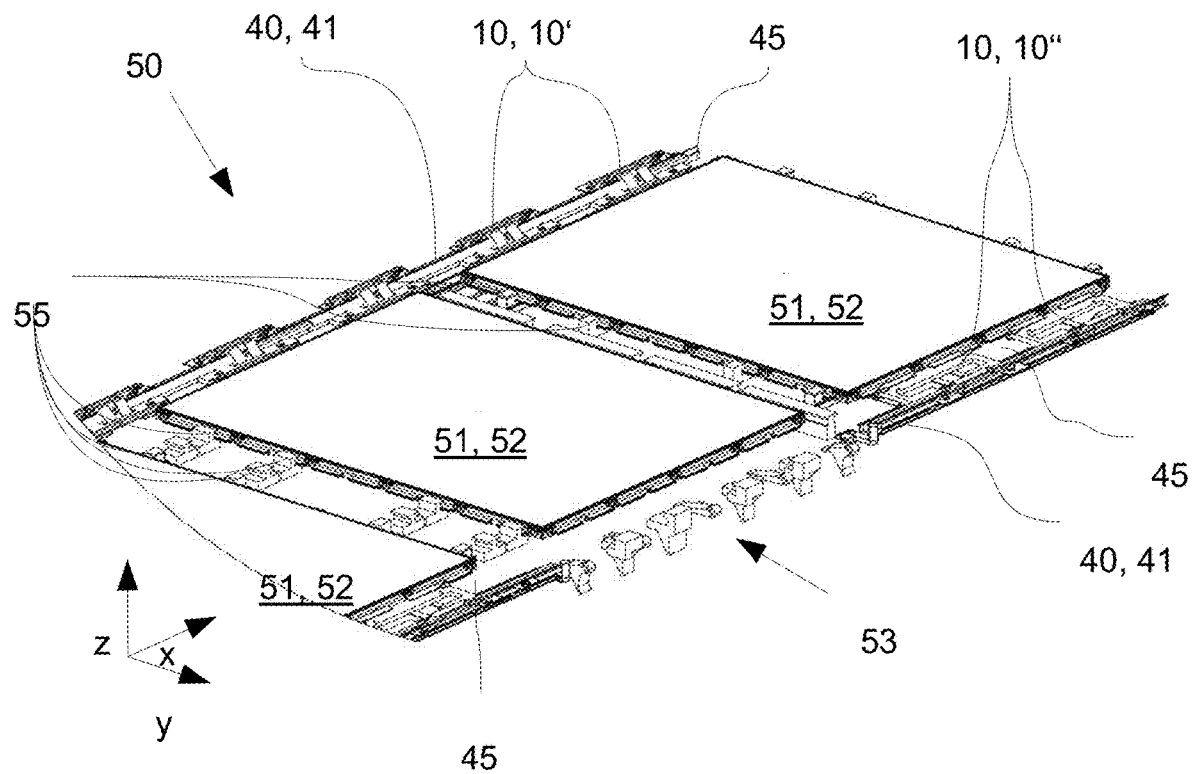
FIG. 2 shows a detailed perspective view of the cargo deck according to FIG. 1 in a door area.

FIG. 1 and FIG. 2 show a cargo deck 50 according to an exemplary embodiment according to the invention. The cargo deck 50 has a longitudinal extension, the longitudinal direction of which is substantially parallel to the X-axis of the aircraft. In the cargo deck 50, a plurality of cargo items 51 are arranged in longitudinal alignment and spaced apart from each other. The cargo items 51 are pallets 52, which are preferably used in the military sector. In total, exactly six cargo items 51 are arranged in a row.

A side guide system 40 is arranged on each of the cargo hold sides in the transverse direction of the cargo deck 50. The transverse direction is substantially parallel to the Y-axis of the aircraft. Specifically, two side guide systems 40 are spaced apart from each other in the cargo deck 50 in the transverse direction and are arranged opposite each other. The side guide systems 40 thereby limit the pallets 52 in the transverse direction on both sides, with a door area 53 being excluded. On the cargo hold side with the door area 53, the side guide system 40 is interrupted in the door area 53.

The two side guide systems 40 have a plurality of side guide adapters 10 that laterally guide and hold the pallets 52. In addition to the guiding and retaining function of the side guide adapters 10, these serve to transfer transverse forces occurring from the cargo items to a side guide 41 of the respective side guide system 40. The side guide adapters 10 will be discussed in more detail later.

Figure 3:
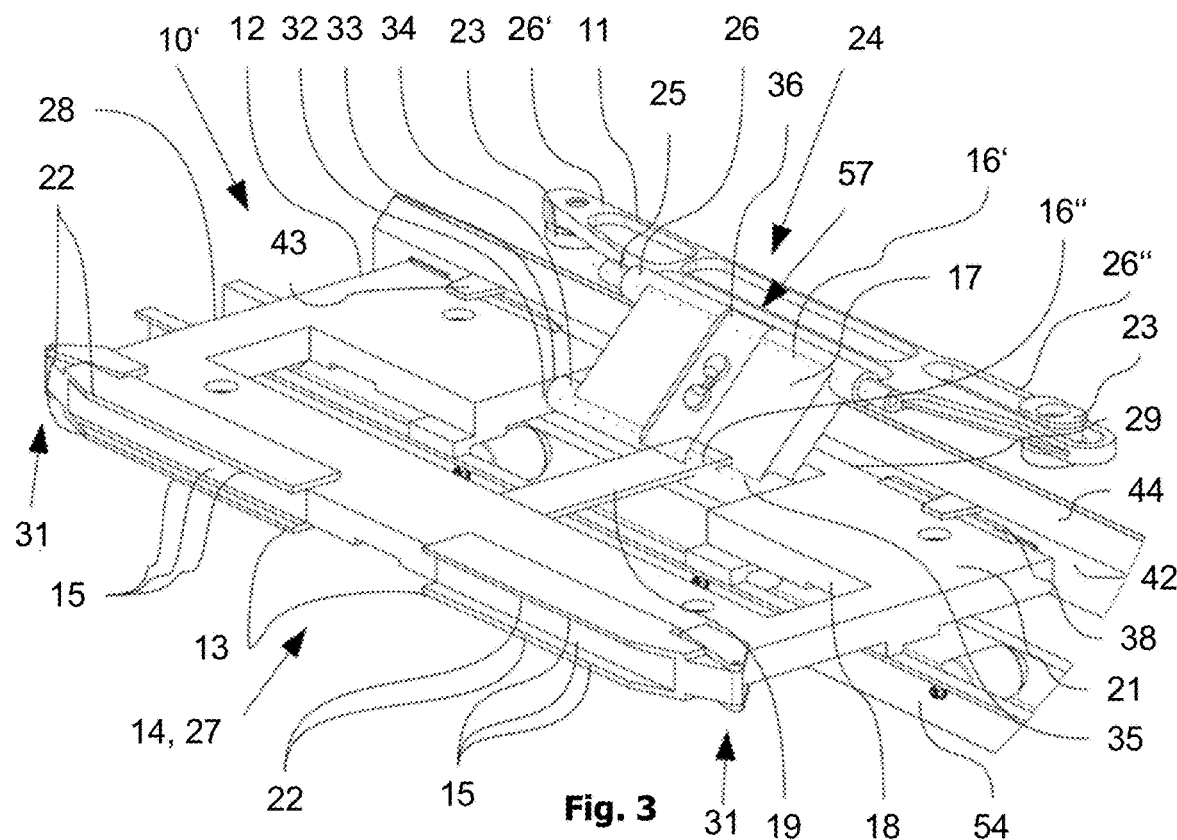
FIG. 3 shows a perspective view of a side guide adapter in the installed state according to an exemplary embodiment of the invention.
Figure 4:
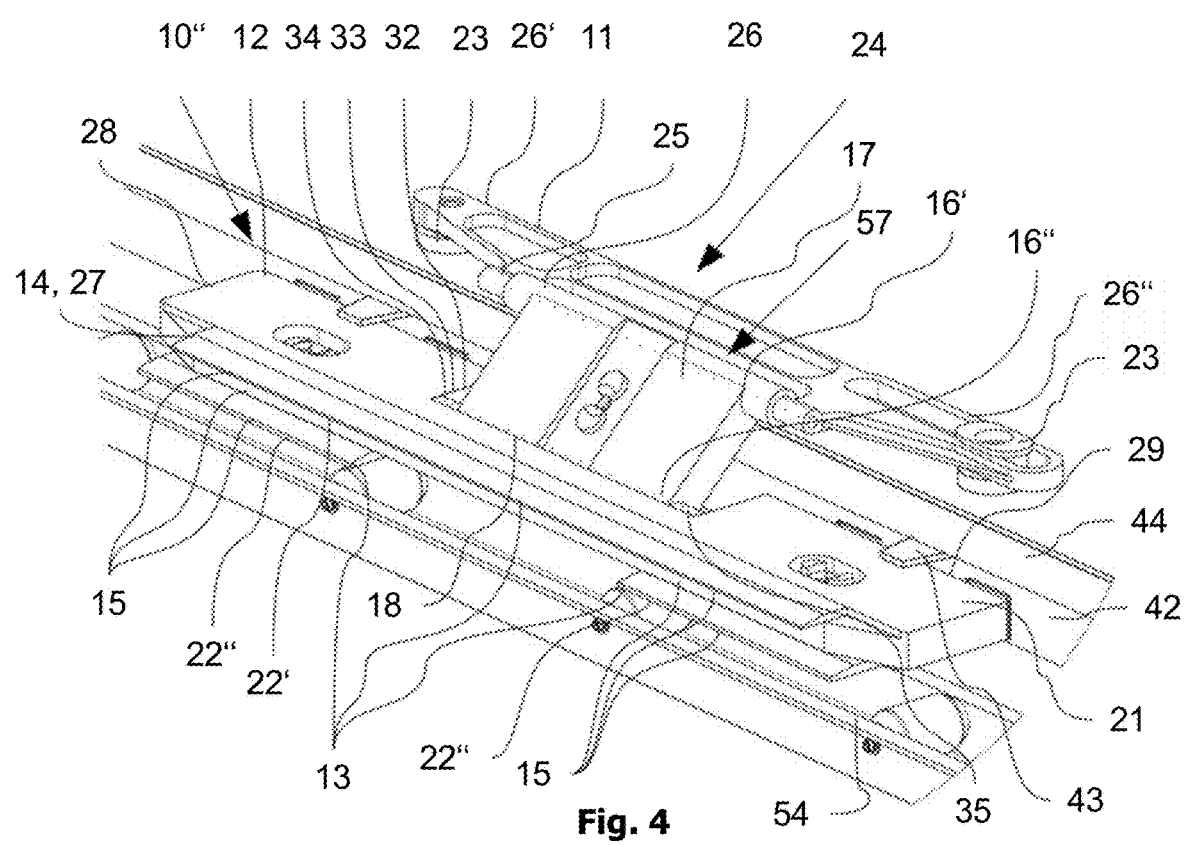
FIG. 4 shows a perspective view of a side guide adapter in the installed state according to a further exemplary embodiment according to the invention.

The respective side guide system 40 comprises the aforementioned side guide 41. The side guide 41 comprises a guide rail 44 extending in the longitudinal direction of the cargo deck 50. The guide rail 44 comprises at least one abutment surface 42 against which at least one of the side guide adapters 10 abuts in the unfolded and installed state. This is clearly visible in FIGS. 3 and 4. Furthermore, FIGS. 3 and 4 show that the guide rail 44 of the side guide 41 has two stop elements 43 in the region of a respective side guide adapter 10, which hold the respective side guide adapter 10 against the guide rail 44 in the vertical direction of the cargo deck 50. The vertical direction of the cargo deck 50 is substantially parallel to the Z-axis of the aircraft. The stop elements 43 will be discussed in more detail below.

Furthermore, the side guide 41 comprises at least one rail section (not shown) for mounting at least one side guide adapter 10 in each case. The rail section is preferably oriented in the longitudinal direction of the cargo deck 50. The rail section is preferably formed by a subsection of a perforated rail. The subsection may have at least a single hole, preferably at least two holes, for fastening. The rail section is arranged in vertical direction above the guide rail 44 or the abutment surface 42.

As can be readily seen in FIGS. 1 and 2, the two side guide systems 40 are spaced apart from each other in the transverse direction, with the pallets 52 being disposed between the side guide systems 40. In order to bridge a distance between the respective side guide 41, the side guide systems 40 each have the aforementioned side guide adapters 10.

According to FIGS. 3 and 4, an exemplary embodiment of a side guide adapter 10 according to the invention is shown. Specifically, FIG. 3 exemplarily shows a first type of one of the side guide adapters 10' which are arranged in the transverse direction on the cargo hold side of the cargo deck 50 with the door area 53. FIG. 4 shows, by way of example, a second type of one of the side guide adapters 10" arranged in the transverse direction on the cargo space side of the cargo deck 50 opposite the door area 53.

The side guide adapters 10', 10" according to FIGS. 3 and 4 each have a fastening element 11 for fastening to the rail section of the side guide 41, which is not shown. The fastening element 11 is of elongated design. The fastening element 11 has a first connection region 24, which comprises a first hinge part 25. The first hinge part 25 forms, with a second hinge part 26 of a connector 17, a first hinge 57 having a first hinge axis 16'. The first hinge axis 16' forms an axis of rotation about which the fastening element 11 is rotatably mounted. The connector 17 will be discussed in more detail later.

The connection region 24 is arranged in the longitudinal direction of the fastening element 11 between two fastening regions 26', 26". In this case, a first fastening region 26' comprises a first stationary pin 23. The first pin 23 is fixedly arranged at a longitudinal end of the fastening element 11. The second fastening region 26" is arranged at the connecting region 24 longitudinally opposite the first fastening region 26'. The second fastening region 26" comprises an elongated hole in the longitudinal direction, in which a second pin 23 is movably guided. The second pin 23 is movable relative to the first pin 23. The two pins 23 are spaced apart from one another in the longitudinal direction. The two pins 23 serve to fasten the fastening element 11 to the rail section (not shown), which is preferably a perforated rail section. Thereby, the two pins 23 are in engagement with the rail section.

Furthermore, the side guide adapters 10', 10" comprise a spacer element 12 for bridging a gap between the side guide 41 and the pallet 52. Specifically, the spacer element 12 bridges a lateral gap 45 between the guide rail 44 and an edge of the pallet 52 in the unfolded and installed state.

The spacer element 12 is of plate-shaped design. In other words, the spacer element 12 forms a spacer plate. The spacer element 12 has two parallel longitudinal sides 27 and two parallel broadsides 28, wherein the longitudinal sides 27 are larger than the broadsides 28. The longitudinal sides 27 and the broadsides 28 are oriented substantially orthogonally to each other. Furthermore, the spacer element 12 has a thickness that is less than the longitudinal sides 27 and the broadsides 28 of the spacer element 12. In other words, the spacer element 12 is cuboidal in shape.

The spacer element 12 has an end face 14 formed by a first of the longitudinal sides 27. The end face 14 of the spacer element 12 extends in the longitudinal direction of the cargo deck 50. The end face 14 faces a cargo item 51 in use. A second of the two longitudinal sides 27 is disposed opposite the end face 14. The second of the two longitudinal sides 27 forms a stop side 29 through which the spacer element 12 abuts the abutment surface 42 of the side guide 41.

In the side guide adapter 10' according to FIG. 3, two retaining sections 13 are hingedly arranged on the end face 14 of the spacer element 12. Specifically, the retaining sections 13 are arranged at corner regions 31 of the end face 14 so as to be laterally pivotable. For this purpose, the spacer element 12 has a hinge in each corner region 31 by means of which the respective retaining section 13 is pivotably arranged.

As shown in FIG. 3, the two retaining sections 13 are spaced apart from each other along the end face 14. The retaining sections 13 each comprise a retaining contour 15 for guiding or retaining the respective pallet 52. The retaining contour 15 is formed by two oppositely disposed retaining lugs 22 spaced from each other in the vertical direction. In other words, the retaining contour 15 is of U-shaped design. The retaining contour 15 provides a free space which, in the installed position, is bounded at the top and bottom by a retaining lug 22. In the unfolded and installed state of the side guide adapter 10, the retaining contour 15 is open towards the pallet 52. As can be seen in FIG. 3, the retaining contour 15 is formed to be continuous in the longitudinal direction at the respective retaining section 13. Alternatively, it is possible that the retaining contour 15 is partially or sectionally formed in the longitudinal direction at the respective retaining section 13.

In contrast to the side guide adapter 10" according to FIG. 3, the side guide adapter 10" according to FIG. 4 has a single retaining section 13 which is firmly formed on the end face 14 of the spacer element 12. This retaining section 13 comprises a retaining contour 15 with a continuous retaining lug 22' and a split retaining lug 22". The continuous retaining lug 22' and the split retaining lug 22" are arranged opposite each other. In the installed position, the continuous retaining lug 22' is arranged on top and the split retaining lug 22" is arranged on the bottom of the end face 14. The continuous retaining lug 22' is formed closed along the end face 14 in the longitudinal direction. The split retaining lug 22" is interrupted in the longitudinal direction.

In the side guide adapter 10', 10" according to FIGS. 3 and 4, the spacer element 12 further comprises a receiving opening 18 and a surface 21. The receiving opening 18 completely penetrates the spacer element 12 starting from the surface 21. In other words, the receiving opening 18 forms a free passage through the spacer element 12 starting from the surface 21. The surface 21 of the spacer element 12 is formed orthogonally to the end face 14. In the unfolded and installed state of the side guide adapter 10, the surface 21 is arranged at the top in the vertical direction.

The receiving opening 18 of the spacer element 12 according to FIG. 3 is T-shaped. The receiving opening 18 has a limited circumferential design in the spacer element 12. In contrast, the receiving opening 18 of the spacer element 12 according to FIG. 4 is open towards the stop side 29. In the unfolded and installed state, the receiving opening 18 is open towards the abutment surface 42. The receiving opening 18 according to FIG. 4 is C-shaped.

The spacer element 12 of the side guide adapter 10' shown in FIG. 3 further includes a support surface 19 that forms a boundary on the side opposite the surface 21 for the receiving opening 18. As can be seen in FIG. 3, the support surface 19 is part of a transverse web that spans the receiving opening 18 in the transverse direction.

The spacer element 12 of the two side guide adapters 10', 10" has a second connection region 32 comprising a third hinge part 33. The third hinge part 33 forms with a fourth hinge part 34 of the connector 17 a second hinge 35 with a second hinge axis 16". The second hinge axis 16" forms a further axis of rotation about which the spacer element 12 is rotatably mounted.

The second connection region 32 is arranged in the receiving opening 18. The third hinge part 33 is part of the spacer element 12. The second hinge axis 16" is embedded in the receiving opening 18. The first hinge axis 16' is embedded in the fastening element 11. The two hinge axes 16', 16" are arranged in parallel. The two hinge axes 16', 16" are spaced apart from each other. Furthermore, the two hinge axes 16', 16" are arranged parallel with the end face 14 of the spacer element 12.

As described above, the side guide adapter 10 has a connector 17. The connector 17 interconnects the spacer element 12 and the fastening element 11. The connector 17 extends between the spacer element 12 and the fastening element 11. The connector 17 forms a web element. The connector 17 is arranged transversely to the end face 14 of the spacer element 12.

As can be readily seen in FIG. 3, the connector 17 comprises first and second hinge axes 16', 16", with one of the hinge axes 16', 16" being disposed at each longitudinal end of the connector 17. The connector 17 forms the first and second hinges 57, 35 with the fastening element 11 and the spacer element 12. The connector 17 thus forms a double hinge. In other words, the fastening element 11 and the spacer element 12 are connected to each other in a double-hinged manner by the connector 17.

In the side guide adapter 10' according to FIG. 3, the fastening element 11 can be pivoted into the receiving opening 18 by means of the connector 17. The first hinge axis 16' is arranged in such a way that the fastening element 11 together with the connector 17 can be pivoted into the receiving opening 18. This corresponds to the folded state of the side guide adapter 10' according to FIG. 3, in which the fastening element 11 and the connector 17 are recessed in the receiving opening 18. The fastening element 11 and the connector 17 may be flush with at least the surface 21 in the folded state. In other words, the fastening element 11 and the connector 17 may be recessed in the folded state in such a way that they do not protrude beyond the surface 21.

In the folded state, it is provided that the fastening element 11 and the connector 17 rest on the support surface 19. The connector 17 has a groove 36 that corresponds to the shape of the support surface 19.

In the case of the side guide adapter 10" according to FIG. 4, only the connector 17 can be pivoted into the receiving opening 18. The first hinge axis 16' is arranged in such a way that the connector 17 can be pivoted into the receiving opening 18. This corresponds to the folded state of the side guide adapter 10" according to FIG. 4, in which the connector 17 is recessed in the receiving opening 18. In the folded state, the connector 17 may be at least flush with the surface 21. In other words, the connector 17 may be recessed in the folded state such that it does not protrude above the surface 21.

As shown in FIGS. 3 and 4, the fastening element 11 and the spacer element 12 have an offset in the vertical direction in the unfolded state. Specifically, in the unfolded state, the fastening element 11 and the spacer element 12 are arranged in different planes that are spaced apart in the vertical direction. This can also be seen clearly in FIG. 5.

In order to hold the side guide adapter 10', 10" according to FIGS. 3 and 4 in the unfolded and installed state on the guide rail 44 of the side guide 41 in the vertical direction, the guide rail 44 has two stop elements 43. The stop elements 43 extend from the abutment surface 42 in the transverse direction (Y-axis) towards the cargo space of the cargo deck 50. The stop elements 43 project beyond the spacer element 12 in the transverse direction. In other words, the stop elements 43 are arranged above a partial area of the spacer element 12 in the installed state. The stop elements 43 form a vertical stop, i.e. a vertical limit. The stop elements 43 limit a vertical movement of the spacer element 12. The stop elements 43 are arranged opposite each other in the longitudinal direction on the connector 17. In other words, one of the stop elements 43 is formed on each side of the connector 17 in the longitudinal direction.

The spacer element 12 of the side guide adapter 10' according to FIG. 3 has two counter-stop elements 38, which are arranged opposite the stop elements 43 of the guide rail 44 in the installed position. The counter-stop elements 38 can cooperate with the stop elements 43 for vertical limitation. The side guide adapter 10" according to FIG. 4 lacks such counter-stop elements.

Figure 5:
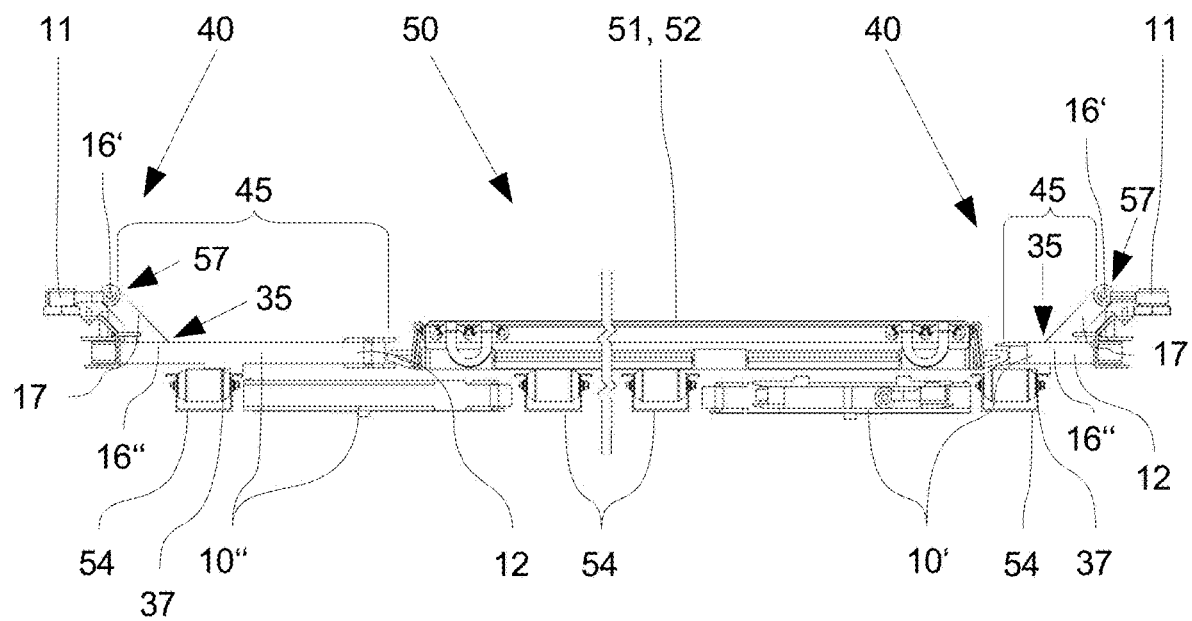
FIG. 5 shows a side view in the X-direction of the cargo deck according to FIG. 1.

In the cargo deck 50 according to the invention, a plurality of roller conveyors 54 are arranged in the longitudinal direction of the cargo deck 50 for loading and unloading the cargo space. As can be seen in FIG. 5, the side guide adapters 10', 10" have roller contours 37 on their underside to correspond with the rollers of the roller conveyors 54.

FIG. 5 further shows a pallet 52 that is guided and retained between the side guide adapters 10', 10". The side guide adapters 10', 10" are designed to absorb forces occurring in the transverse direction of the cargo deck 50 and to introduce them into the respective guide rail 44 of the side guide 41. Additional locking devices 55, which are clearly visible in FIG. 2, are used to absorb forces in the longitudinal and vertical directions of the cargo deck 50.

Figure 6:
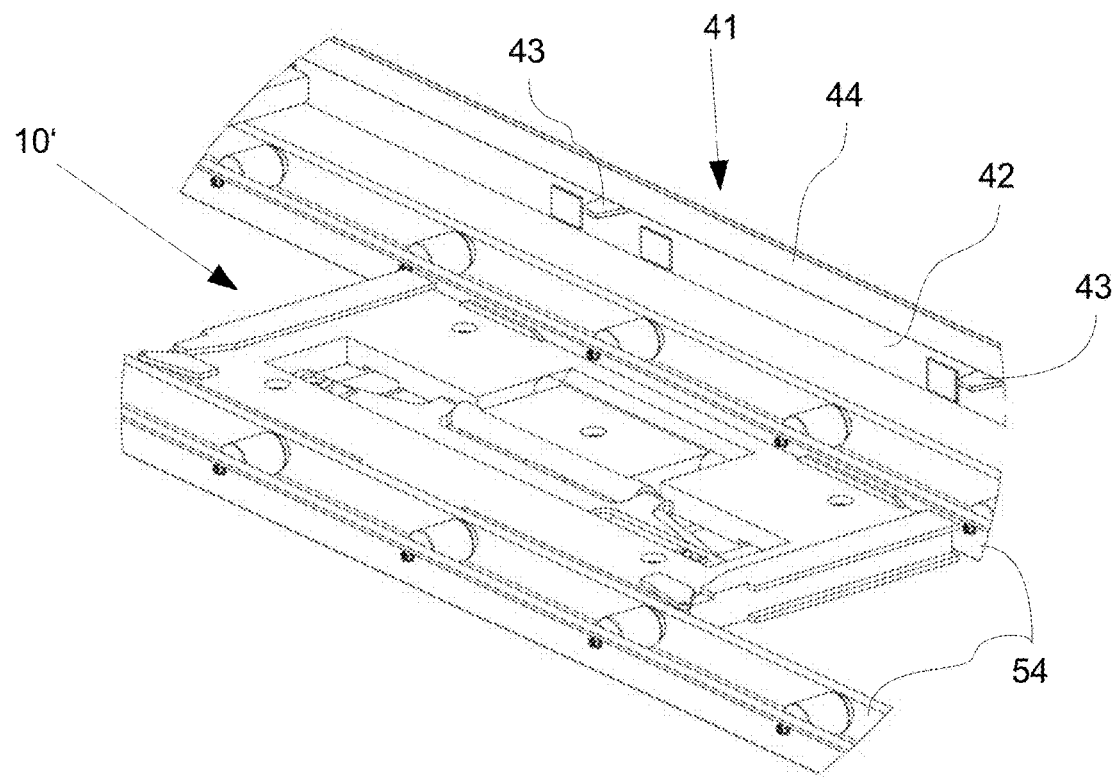
FIG. 6 shows a perspective view of the side guide adapter according to FIG. 3 in the storage state.
Figure 8:
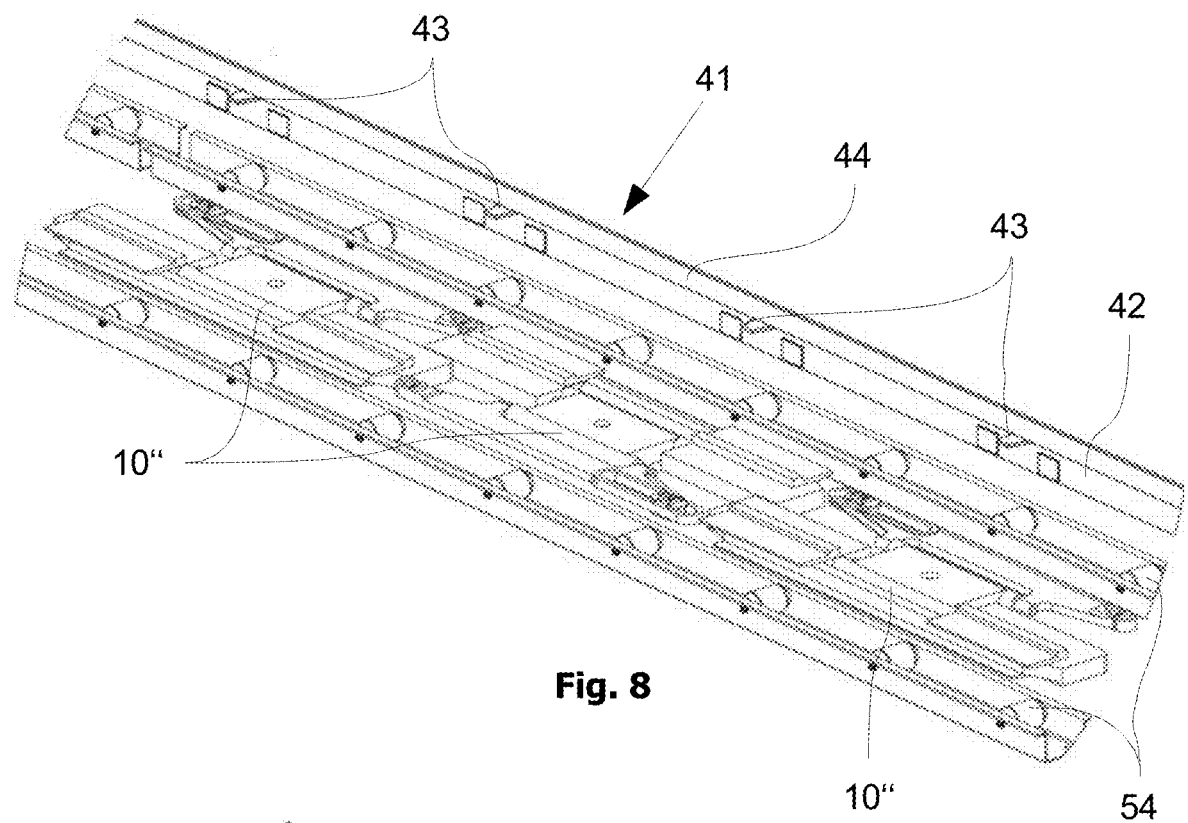
FIG. 8 shows a perspective view of several side guide adapters according to FIG. 4 in the storage state.

FIGS. 6 and 8 show side guide adapters 10', 10" in the folded state. FIG. 6 shows an example of a single side guide adapter 10' as shown in FIG. 3, which is arranged in the folded state between two roller conveyors 54 below a loading level of the cargo deck 50. Here, the two retaining sections 13 are folded laterally against the broadsides 28 of the spacer element 12 and the fastening element 11 and the connector 17 are recessed in the receiving opening 18. The loading plane is an imaginary plane which, when stretched out, rests with its plane surface on the rollers of the roller conveyors 54.

Figure 7:
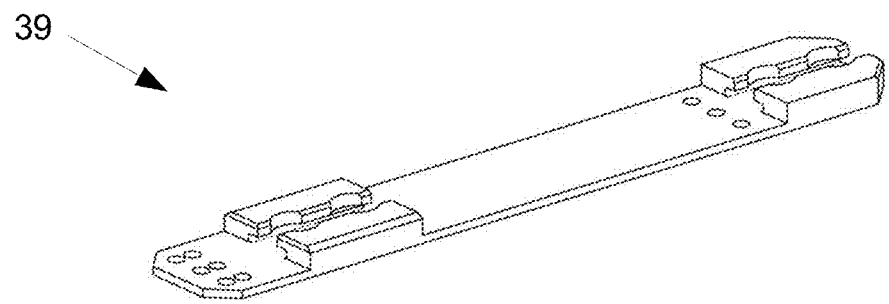
FIG. 7 shows a perspective view of a fastening device for the side guide adapter according to FIG. 3.

In order to fix the side guide adapter 10' in its storage plane, fastening devices 39 are provided (cf. FIG. 7), which are arranged on cross struts of the aircraft structure that are not shown. Preferably, two fastening devices 39 are arranged on two adjacent cross struts each. The distance between the cross struts can be approximately 535 mm. This corresponds to a standardized frame spacing of the aircraft structure.

Preferably, a side guide adapter 10' according to FIG. 3 can be attached to each of the two fastening devices 39 by means of a quick-release fastener system.

Figure 9:
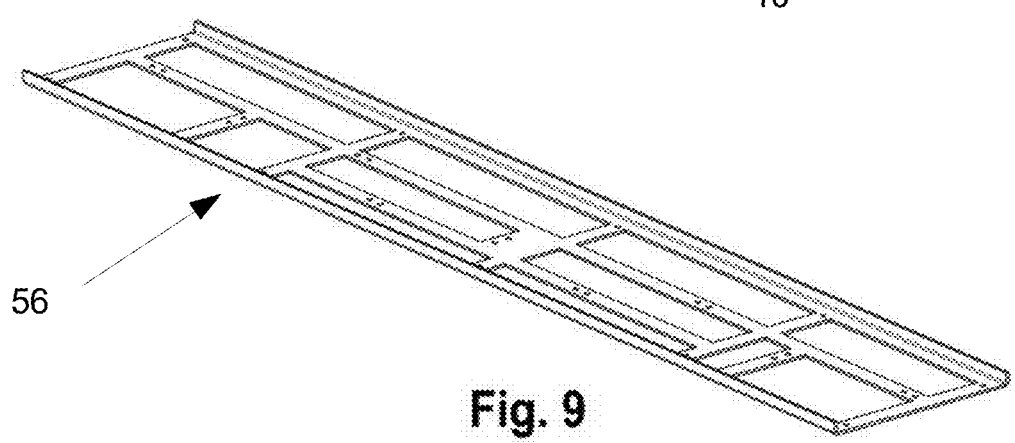
FIG. 9 shows a perspective view of a further fastening device for the side guide adapter according to FIG. 4.

FIG. 8 shows several side guide adapters 10" as shown in FIG. 4, which are arranged in a row in the longitudinal direction and alternately in the transverse direction and which, in the folded state, are arranged between two roller conveyors 54 below the loading level of the cargo deck 50. In the folded state, the fastening element 11 and the connector 17 are folded down towards the stop side 29 of the spacer element 12 in such a way that they lie in a common plane. In order to be able to store or keep the folded side guide adapters 10" in an improved manner, a frame 56 is preferably provided (cf. FIG. 9), in which the side guide adapters 10" are accommodated in their arrangement described above. The vertical position of the two side guide adapters 10', 10" in the storage plane below the loading plane is clearly visible in FIG. 5.

The connection between the fastening element 11 and the rail section, in particular the perforated rail section, can be produced in different ways. A reversible connection option is described in DE 42 16 413 A1. In a further exemplary embodiment according to the invention, at least two pins are provided which project into the corresponding holes of the perforated rail section. A twistable T-anchor is located between the pins. After insertion of the fastening element 11, this T-anchor is twisted in such a way that the fastening element 11 is held at the sections between the holes in such a way that it cannot be removed in the Z-direction. In the inserted state, the pins then prevent the fastening element from moving in the X direction.

LIST OF REFERENCE SIGNS

10 Side guide adapter
10' Side guide adapter of first type
10" Side guide adapter of second type
11 Fastening element
12 Spacer element
13 Retaining section
14 End face
15 Retaining contour
16 Hinge axis
16' First hinge axis
16" Second hinge axis
17 Connector
18 Receiving opening
19 Support surface
21 Surface
22 Retaining lug
22' Continuous retaining lug
22" Split retaining lug
23 Pin
24 First connection region
25 First hinge part
26 Second hinge part
26' First fastening region
26" Second fastening region
27 Longitudinal side
28 Broadside
29 Stop side
31 Corner region
32 Second connection region
33 Third hinge part
34 Fourth hinge part
Second hinge
36 Groove
37 Roller contours
38 Counter-stop element
39 Fastening device
Side guide system
41 Side guide
42 Abutment surface
43 Stop element
44 Guide rail
Lateral gap
50 Cargo deck
51 Cargo item
52 Pallet
53 Door area
54 Roller conveyor
55 Locking devices
56 Frame
57 First hinge

The invention claimed is:

1. A side guide adapter for guiding and/or retaining a cargo item in an aircraft, comprising:
    at least one fastening element for fastening to a rail section of a side guide;
    at least one spacer element for bridging a distance to the cargo item, wherein the spacer element and the fastening element are hingedly connected to each other, wherein the spacer element and the fastening element each are rotatably mounted about at least one hinge axis which extends parallel to the end face of the spacer element, wherein the fastening element is rotatably mounted about a first hinge axis and the spacer element is rotatably mounted about a second hinge axis, and wherein the first and second hinge axes form a double hinge and are arranged parallel to one another; and
    at least one retaining section for the cargo item, which is arranged on an end face of the spacer element and comprises at least one retaining contour for guiding and/or retaining the cargo item.

2. The side guide adapter of claim 1, wherein the cargo item is a pallet.

3. The side guide adapter of claim 1, wherein the rail section is a perforated rail section.

4. The side guide adapter of claim 1, wherein the first and second hinge axes are arranged at a distance from one another.

5. The side guide adapter of claim 1, further comprising at least one connector, which comprises the first and second hinge axes, and hingedly connects the spacer element to the fastening element.

6. The side guide adapter of claim 5, wherein the connector is arranged transversely to the end face of the spacer element, and extends between the spacer element and the fastening element.

7. The side guide adapter of claim 5, wherein the spacer element defines at least one receiving opening into which of the fastening element and the connector can be pivoted for storage.

8. The side guide adapter of claim 7, wherein the spacer element has at least one support surface which at least partially bounds the receiving opening, so that in a pivoted state of the connector and the fastening element each rest on the support surface.

9. The side guide adapter of claim 7, wherein the spacer element comprises at least one surface with which the fastening element is at least flush in the pivoted state.

10. The side guide adapter of claim 1, wherein at least one of the spacer element, the fastening element, or the connector is of plate-shaped design.

11. The side guide adapter of claim 1, wherein the retaining contour of the side guide adapter comprises two oppositely arranged retaining lugs which are formed so as to protrude from the spacer element and are spaced apart from one another for accommodating the cargo item.

12. The side guide adapter of claim 1, wherein the retaining section of the side guide adapter, which has the retaining contour, is hingedly or fixedly on the end face of the spacer element.

13. The side guide adapter of claim 1, wherein the fastening element has at least two spaced-apart pins for engaging the rail section, wherein at least one of the two pins is displaceably arranged.

14. The side guide system of claim 1, wherein the side guide comprises at least one stop element arranged above the spacer element in the installed position.

15. A cargo deck comprising at least one side guide adapter of claim 1.

16. The cargo deck of claim 15, wherein a plurality of side guide adapters are arranged in a folded state for storage in a plane that lies below a loading plane of the cargo deck.

17. A method for converting a cargo deck of an aircraft by means of at least one side guide adapter of claim 1, comprising:
- attaching the side guide adapter to the rail section via the fastening element; and
- folding the spacer element down in such a way that the spacer element abuts an abutment surface of a side guide of the cargo deck.

18. A side guide system, comprising:
- a side guide, which has at least one rail section;
- at least one abutment surface; and
- at least one side guide adapter of claim 1, wherein, in an unfolded state, the fastening element of the side guide adapter is fastened to the rail section and the spacer element of the side guide adapter abuts the abutment surface of the side guide.

* * * * *